United States Patent [19]

Hosoe et al.

[11] 4,123,650
[45] Oct. 31, 1978

[54] RANGE FINDER SYSTEM

[76] Inventors: Kazuya Hosoe, Machida; Seiichi Matsumoto, Yokohama; Hideo Yokota, Tokyo; Tsuyoshi Asaeda, Sagamihara; Tadahide Fukushima, Tokyo; Tamotsu Shingu, Kamakura; Shigeru Hashimoto, Yokohama; Tomonori Iwashita, Chofu, all of Japan

[21] Appl. No.: 755,006

[22] Filed: Dec. 28, 1976

Related U.S. Application Data

[63] Continuation of Ser. No. 552,320, Feb. 24, 1975, abandoned.

[30] Foreign Application Priority Data

Feb. 26, 1974 [JP] Japan .................................. 49-23088

[51] Int. Cl.² .......................... G01J 1/20; G03B 7/08
[52] U.S. Cl. ..................... 250/201; 354/25; 356/1; 356/4
[58] Field of Search ............ 250/201; 354/25; 356/1, 356/4, 141

[56] References Cited

U.S. PATENT DOCUMENTS

| | | | |
|---|---|---|---|
| 3,497,301 | 2/1970 | Buchla | 356/4 |
| 3,610,754 | 10/1971 | Pirlet | 356/1 |
| 3,723,003 | 3/1973 | Vockenhuber et al. | 356/4 |
| 3,856,399 | 12/1974 | Hosoe et al. | 354/25 |

*Primary Examiner*—S. C. Buczinski

[57] ABSTRACT

A range finder system to detect distance to an object by irradiating radiation toward an object, a distance to which is to be detected based on the principle of a base line range finder and receiving radiation being reflected by said object. It is particularly characterized by that a distance to an object is detected by irradiating a photoelectric conversion means with radiation and then comparing the signal outputted by said photoelectric conversion means with a prescribed reference signal. And the system of the present invention has, for that end, a radiation generation source to generate radiation, a light receiving system being positioned with a prescribed base line distance from said radiation generation source for receiving the reflected radiation being emitted by the radiation generation source and reflected by the object, a photoelectric conversion means to take in the radiation from said light receiving system being reflected by said object, an oscillating device having such function as intermittently irradiating the above mentioned photoelectric conversion means with the radiaton reflected by the above mentioned object within the radiation path between said photoelectric conversion means and the above mentioned radiation source, a reference signal generation means to generate reference signal, and a signal comparison means to compare the signal generated by the above mentioned photoelectric conversion means and the above mentioned reference signal.

39 Claims, 24 Drawing Figures

RANGE FINDER SYSTEM

This is a continuation of application Ser. No. 552,320, filed Feb. 24, 1975 now abandoned.

BACKGROUND OF THE INVENTION

1. Field of the Invention

The present invention relates to a range finder system and particularly to a range finder system to detect the distance from an object by irradiating radiation toward an object distance to which is to be detected, based on the principle of base line range finder, and receiving the reflected radiation being reflected by said object.

2. Description of the Prior Art

Heretofore, various kinds of base line range finders have been known without especially showing them here. Particularly, such base line range finders of an upper and lower images matching type or of double images matching type as being so made as conducting automatic range detection by photoelectrically detecting the matching state of the images are known already by Japanese Patent Application Publication Nos. Sho 39-20056 or Sho 41-16225, etc. Further, an automatic focus adjusting device of a camera based on the principle of said base line range finder of images matching type is already known by Japanese Patent Application Publication No. Sho 48-5733, etc.

For example, the Japanese Patent Application Publication No. Sho 39-20056 discloses a base line range finder of automatic upper and lower images matching type which is so made that two photoelectric conversion elements are placed closely to each other at the imaging plane of upper and lower images sandwitching the image dividing line and the matching state of the images is automatically detected without eye sight by said two photoelectric conversion elements in range finding so that the distance to an object can be detected.

Also, the Japanese Patent Publication No. Sho 41-16225 discloses an images matching detection device suitable to a base line range finder of double images matching type which is so made that a photoelectric conversion element is positioned at a focal plane where double images appear, and detection of matching double images can be automatically done by utilizing the fact that the output of said element reaches its maximum value as the double images properly match on said element.

Furthermore, the Japanese Patent Application Publication No. Sho 48-5733 discloses an automatic focus adjustment device of a camera which is so made that utilizing the fact that discrepancy in the two images generated by optical positioning of a base line range finder is a function of the distance to an object, and said function is made as an output depending on the difference of the resistance values in a pair of photoelectric conversion elements, on the other hand, a device generating electric output depending on the proceeding and retreating thereof is provided at a photographing lens, and the output at the photographing lens side follows the output derived from the discrepancy of the above mentioned two images so that the automatic focus adjustment of photographing lens can be done.

However, each of said devices has such common shortcomings that detection of distance is impossible when an object to be sensed does not have distinct difference in the brightness against the surrounding scene, or when it is in a dark place. This is derived from the fact that each of said devices is a so-called a passive type device that is to detect the light generated from the object to be sensed itself (that is the light generated from an object to be sensed or external light reflected by the object to be sensed.)

As a method for eliminating such shortcomings, for example, a so-called active type method has been considered effective that is an artificial radiation is projected toward an object to be sensed and said radiation being reflected by the object to be sensed is detected for conducting distance sensing, and a device employing such method has already been proposed, for example, by U.S. Pat. Nos. 3,435,744 or 3,442,193, etc.

Said U.S. Pat. Nos. 3,435,744 and 3,442,193 are to disclose entirely identical device and these patents disclose an automatic focus adjustment device of a camera which is so made that the ray of light omitted by a light source positioned in a predetermined relationship against a camera is pointed toward an object, and the ray of light reflected by an object is received by a photo-responsive device containing a photoelectric conversion element being positioned in a lateral direction from the light source through a prescribed base line distance, and then said photo-responsive device is brought to matched state against the reflected ray of light, thereby detecting the angle between the ray of light emitted and the ray of light reflected so that focus adjustment of a photographing lens system is done based on thus detected angle.

However, in said method the difference in intensity of weak radiation reflected by an object needs to be detected by a photoelectric conversion element, therefore, for obtaining clear output signal the intensity of radiation by the radiation flux incident into a photoelectric conversion element must be substantially higher than the marginal intensity of radiation which can be detected, thus it has such shortcoming that the accuracy in range detection is lowered as the distance to an object to be sensed becomes greater. Thus, in a device employing above mentioned method the radiation source needs to have high radiation output power, hence power consumption increases and it is not necessarily suitable as a range finder device for use in a small size optical device such as a camera.

SUMMARY OF THE INVENTION

An object of the present invention is to provide an entirely new range finder system in which the above mentioned shortcomings in conventional devices are eliminated.

Another object of the present invention exists in such type of a range finder system that radiation is projected to an object and the reflected beam of said radiation by the object is received for detecting the distance to the object, being so made as being able to detect the distance to the object with high degree of accuracy even if the radiation source has small radiation output.

Further, another object of the present invention is to constitute such range finder system that radiation flux being irradiated from a radiation source and reflected from an object is intermittently irradiated onto a photoelectric conversion means and the space-wise shifting amount of the radiation flux reflected from the object being generated in correspondence to the distance to the object is converted to such signal as converted to such time series as corresponding to the distance to the object so that the distance to the object can be detected.

Still another object of the present invention is to constitute such type of range finder system as receiving the radiation irradiated to an object and reflected by the same for detecting the distance to the object in such form as suitable for application in a focus detection device or an automatic focus adjustment device of an optical system in a small size optical instrument such as a camera, etc.

Still another object of the present invention is to apply a range finder system used in the present invention to an automatic focus adjustment device in an optical instrument such as a camera, etc.

Still further objects of the present invention will become apparent from the specification and the drawings which are to be explained below in detail.

DETAILED DESCRIPTION OF THE PREFERRED EMBODIMENTS

Figure 1:
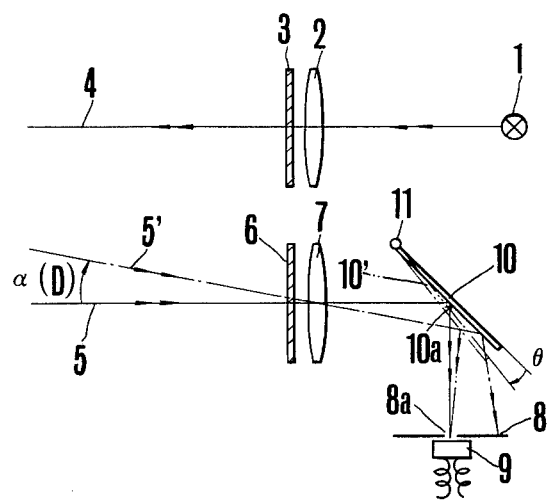
FIG. 1 is a schematic diagram showing a theoretical set-up of a range finder system according to the present invention.
Figure 2:
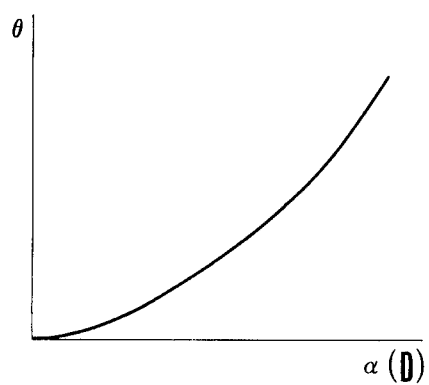
FIG. 2 is a graph showing relationship between the amount $\theta$ of rotation shifting of a thin plate 10 in FIG. 1 and the angle $\alpha$ (D) formed by the way of reflected radiation from an object and the optical axis of a light receiving system of FIG. 1.
Figure 3:
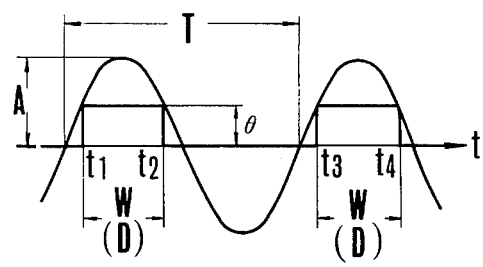
FIG. 3 is a graph showing a chronological process of oscillation in the case when the thin plate 10 in FIG. 1 is oscillated with a constant cycle and a constant amplitude.

The principle of the present invention is illustrated in FIG. 1 to FIG. 3. In FIG. 1, reference character 1 represents a radiation generating source such as a tungsten lamp, an illuminant diode, a discharge tube, etc. An optical projection system 2 projects the image of the radiation generation source 1 onto an object which is not shown in the drawing. A filter 3 changes the radiation emitted by the radiation source 1 to non-visible luminous flux, etc. as required. The radiation generation source 1, projection optical system 2 and filter 3 form a projector which projects the light along an optical axis 4. A filter 6 in a light receiving optical system serves to shield out unnecessary luminous flux such as in a sun beam, electric light beam, etc. A light receiving optical system forms an image from the radiation flux emerging from an object. The optical axis 5 of the light receiving optical system is separated from the optical axis 4 of the projector by a suitable base line interval. A mask 8 forms a fine slit 8a at its center. A photoelectric conversion element 9 is positioned just behind said slit 8a of the mask 8. A thin plate 10 having a mirror plane 10a with regular reflection characteristics is positioned to swing around a fulcrum 11 along the optical path of the light receiving system 7.

In the above mentioned set-up, the radiation flux is reflected by an object after being projected by a projector. The flux enters the light receiving system 7 almost along the optical axis 5 when the object very far. It, then is reflected by the mirror plane 10a of the thin plate 10 at the position shown by solid line it strikes a photoelectric conversion element 9 after passing through the slit 8a of the mask 8. On the other hand, flux which is reflected by and returned from a nearby object for example at distance D enters the light receiving optical system 7 along the path shown by broken line 5' in the drawing. However, when the thin plate 10 is at the position shown by solid line, the radiation flux along path 5' will not strike the photoelectric conversion element 9 as is apparent from the drawing. At this time, if the plate 10 rotates around the fulcrum 11 from the position shown by solid line as much as $\theta$ to the position shown by 10', the flux along 5' as shown in the drawing will properly strike the photoelectric conversion element 9 after passing through the slit 8a. Therefore, the rotational shift $\theta$ of plate 10 from the position shown by the solid line is varied according to the distance D to an object to make the flux reflected by the object properly strike the photoelectric element 9.

The variation of $\theta$ relative to $\alpha$(D) is shown in FIG. 2. Here $\alpha$(D) indicates the angle between the optical axis 5 of the optical system 7 and the path of flux reflected from an object as shown by FIG. 1. The value α(D) is obviously determined by the distance D to the object.

Here, if the plate 10 is caused to oscillate about the fulcrum 11 at a period T and an amplitude A by a suitable oscillation generator not shown in the drawing, a repeated intermittent incidence of flux upon element A occurs in corresponding relationship to the object distance D. The manner of such repeated incidence is shown in FIG. 3. In FIG. 3 abscissa is a time axis and the sine wave indicates chronological oscillation of the plate 10 which oscillates at a cycle T and an amplitude A. According to this graph, the time when the radiation flux reflected from the object at any given distance D strikes the photoelectric conversion element 9 is the time $t_1$ to $t_2$ and $t_3$ to $t_4$ when the thin plate 10 is shifted at least $\theta$ and reaches the position 10' in FIG. 1, and such time will be shown. When the time difference between $t_1$ and $t_2$ and the time difference between $t_3$ and $t_4$ is expressed by W(D), the W(D) is evidently the function of the object distance D. Therefore when a time interval W(D) and W(D)/2 is converted for example to a pulse with a width W(D) or W(D)/2, etc. for detecting the same electrically, the resulting signal indicates the object distance D.

The above describes the principle of distance detection in a range finder system according to the present invention. According to this detection method, it is not necessary to detect the difference in strengths of radiation reflected from an object. The photoelectric element 9 need simply detect whether or not the radiation reflected from the object is incident thereon. Therefore, the radiation output of the radiation generation source 1 can be comparatively small and the deterioration of the detection accuracy accompanying with the increase in the distance to the object is avoided as much as possible.

Figure 4:
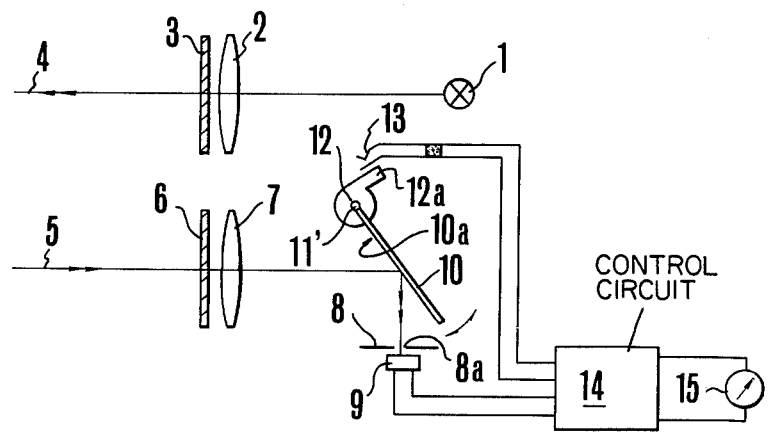
FIG. 4 is a schematic diagram showing set-up of important parts of an example of a range finder system according to the present invention.
Figure 5:
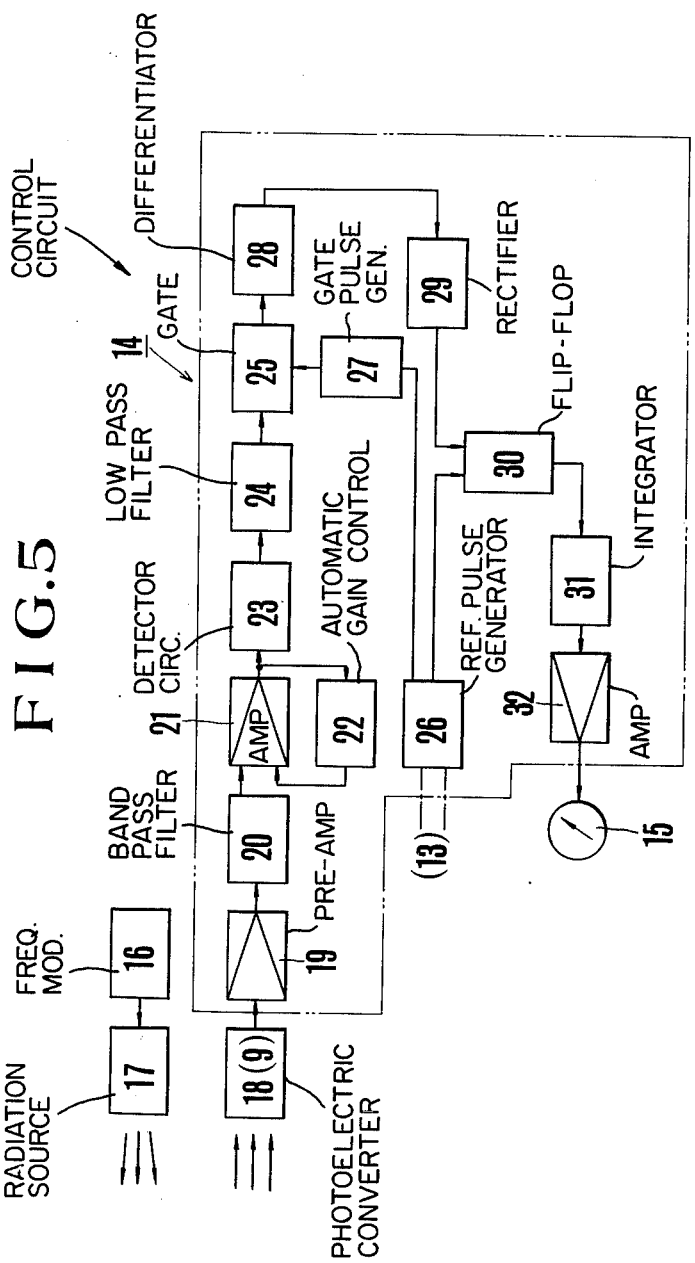
FIG. 5 is a block diagram to show details of an electric circuit of the range finder system shown in FIG. 4.
Figure 6:
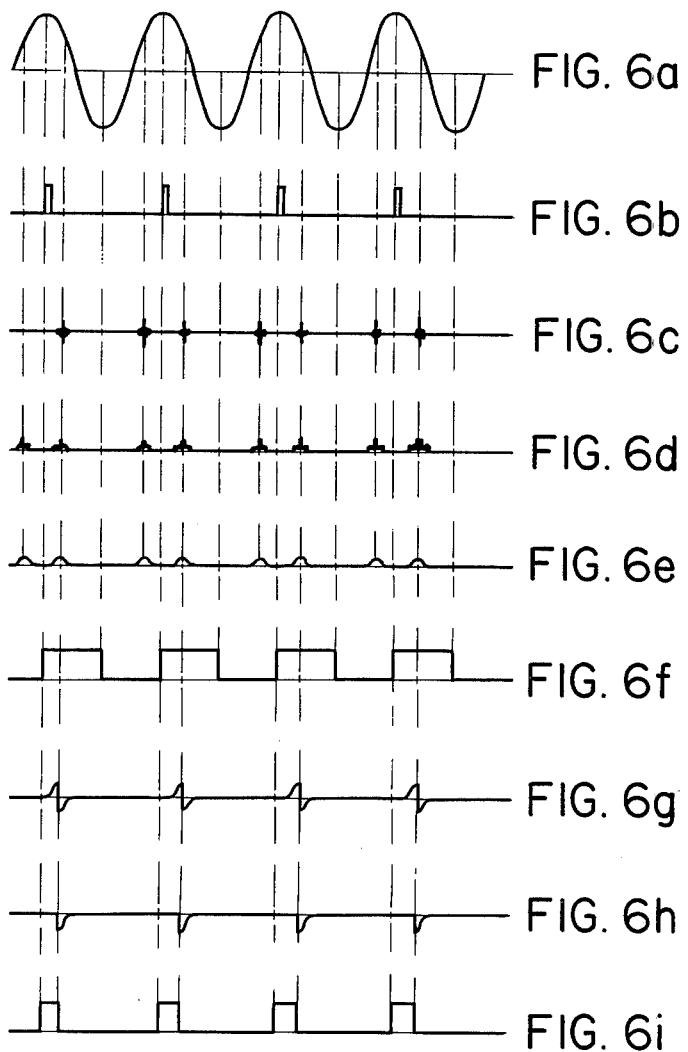
FIG. 6 is a waveform diagram to show chronological change in the oscillation waveform of the thin plate 10 at the time when the above mentioned system is in operation and in the output signal generated in each of circuit parts 26, 18 (9), 23, 24, 27, 28, 29 and 30 in the electric circuit of FIG. 5.

Next, one example of a range finder system embodying the present invention and based on the above mentioned principle is illustrated in FIG. 4 to FIG. 6. In FIG. 4, the set-up and function of the elements shown by numbers 1 to 10 and 8a, 10a are same as those shown by same numbers in FIG. 1. An axle 11' is fixedly provided at a supporting member 12 and the thin plate 10 is fixed to said axle 11'. The plate 10 is continuously oscillated at a constant period and constant amplitude by an oscillation generation device which is not shown in the drawing acting through the axle 11'. A projection from the above mentioned supporting member 12 serves for closing a switch 13 at a position in which the swing of the plate 10 reaches its maximum. The photoelectric element 9 and the switch 13 are connected to a control circuit 14 to be described later. The control circuit 14 receives the output signal of the photoelectric conversion element 9 and the reference pulse signal generated by closing of the switch 13 as input signals. A meter 15 indicates the distance to an object based on the output signal from the control circuit 14.

FIG. 5 is a block diagram showing details of the electric circuit in FIG. 4. Here a radiation source projects radiation frequency modulated by a pulse modulator 16 at a prescribed frequency and is equivalent to the radiation source 1 in FIG. 1. A radiation flux receiving body 18 intermittently receives the radiation flux reflected from an object takes the form of a photoelectric convertor to produce an output signal corresponding to said radiation flux. The body 18 corresponds to the photoelectric conversion element 9 in FIG. 4. A pre-amplifier 19 amplifies the output signal. A band-pass filter 20 passes only the input signal near the modulated frequency. The output of the filter 20 is amplified by an amplifier 21 and is applied to a detector circuit 23. Also the output of the amplifier 21 is fed back through an automatic gain control circuit 22 to stabilize the function of entire control circuit. In the detector circuit 23 a half cycle of the input signal is cut and a low frequency-pass filter 24 takes out the low frequency component and applies it to a gate circuit 25. A reference pulse generator 26 generates reference signal based on cyclic closing of the switch 13. A gate-pulse generator 27 generates gate-pulses in response to the reference pulse from the above mentioned reference pulse generator 26. The gate circuit 25 is turned ON by the gate-pulse generated at said gate-pulse generator 27. Said gate circuit 25 passes the output signal from the low frequency-pass filter 24 only when the gate is ON. A differentiation circuit 28 serves to differentiate the signal passing through the gate circuit 25. A rectifier circuit 29 rectifies the differentiated output of the differentiation circuit 28. A flip-flop receives the output pulse from the reference pulse generator 26 as a set signal and the output signal from the rectifier circuit 29 as a reset signal. The width of the output pulse from said flip-flop corresponds to the object distance. An integrating circuit 31 integrates the output signal from the flip-flop 30. An amplifier amplifies output of the circuit 31, and the above mentioned meter 15 is connected to the output side of said amplifier 32.

FIGS. 6(a) to 6(i) show the oscillation waveform of the thin plate 10 during operation of the system in FIGS. 4 and 5 and illustrate the output waveforms of each circuit component 26, 18 (9), 23, 24, 27, 28, 29 and 30 in the electric circuit of FIG. 5, respectively. The abscissa indicates time in all cases.

First, an oscillation device not shown in the drawing is vibrates or oscillates the thin plate 10 at a constant frequency or period and and constant amplitude as shown in FIG. 6(a). At the same time the control circuit 14 is turned ON to set each circuit component within the control circuit 14 in an operative state. Here, as the oscillation of the thin plate 10 is started the switch 13 is closed at the position of maximum swing said thin plate 10. The reference pulse generator 26 produces the reference pulse shown by FIG. 6(b) based on closing of said switch 13. The frequency of the reference pulse is same as the frequency of oscillation of the thin plate 10, and the reference pulse is supplied to the gate pulse generator 27 to trigger the gate pulse generator, and also to the flip-flop 30 as a set signal of the flip-flop.

Next, the radiation source 17(1) is turned ON, and frequency modulated radiation is projected toward an object, not shown, the distance to which is to be detected. At this time, the radiation flux reflected and returned by an object is reflected by the mirror plane 10a of the thin plate 10 after passing through the light receiving optical system 7, then is pointed toward the photoelectric conversion element 9(18) through the slit 8a of the mask 8. As the thin plate 10 is vibrated at constant frequency and constant amplitude as mentioned above the photoelectric conversion element 9 intermittently receives the radiation flux reflected from an object through the slit 8a. At this time, the signal generated at the photoelectric conversion element 9(18) is as shown by in FIG. 6(c) and is generated twice in one cycle and the time interval thereof corresponds to the distance to an object.

The output signal of the photoelectric conversion element 9(18) is, after being amplified by the amplifier 19, filtered by the band-pass filter 20, and after being amplified by the amplifier 21, the half cycle of the output signal is cut by the detector circuit 23 as shown by FIG. 6(d). The output signal of the detector circuit 23 is filtered by the low pass filter 24 and as shown by FIG. 6(e), the low frequency element only of the signal is taken out.

On the other hand, the gate pulse generator 27 is triggered by the reference pulse (FIG. 6(b)) being produced by the reference pulse generator 26, and generates pulse with predetermined width as shown by FIG. 6(f). This pulse is supplied to the gate circuit 25 as the gate pulse of the circuit. In this example, said gate pulse (FIG. 6(b)) is generated at the same time the reference pulse (FIG. 6(b)) is generated and is set as being continued for example, half cycle of the oscillation of the thin plate 10, and the gate circuit 25 is placed in the state of gate-ON during such period as generating said gate pulse.

The gate circuit 25 passes the output of the low frequency pass filter 24 only when it is set in the state of gate ON by the above mentioned gate pulse (FIG. 6(f)), therefore only one of the pair of signals generated in one cycle of oscillation of the thin plate 10 is made to pass and inputted into the differentiation circuit 28. The signal inputted into the differentiation circuit 28 is differentiated as shown by (g) in FIG. 6, then is rectified by the rectifier circuit 29, further, after having the positive element of the differentiation output cut as shown by (h) in FIG. 6, is inputted into the flip-flop 30 as the reset signal thereof.

While the flip-flop 30 continues its ON state after being set till being reset, its output pulse is shown by (i) in FIG. 6.

Here, the flip-flop 30 is set in synchronism with the generation of the reference pulse (FIG. 6(b)) at the reference pulse generator 26, and is reset by the output (FIG. 6(h)) of the rectifier circuit 29, therefore the pulse width of its output signal (FIG. 6(i)) corresponds to W(D)/2 described in the explanation of FIG. 3, that is, to the distance to an object. The output of said flip-flop 30 is integrated by the integration circuit 31 and is amplified by the amplifier 32, then is converted into such current value or voltage value as corresponding to the object distance. Therefore, the meter 15 connected to the output end of the amplifier 32 indicates the distance to an object based on said current value or voltage value.

Figure 7:
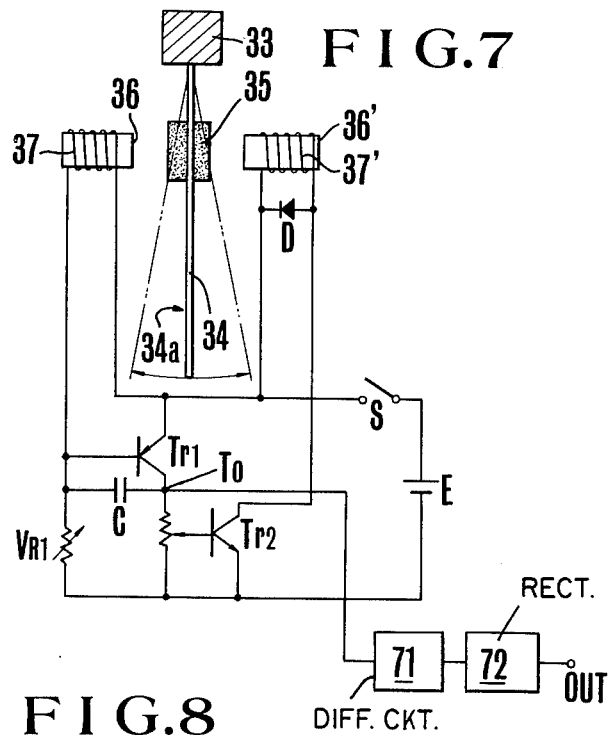
FIG. 7 is a schematic diagram to show set-up of an example of an oscillation device suited to a range finder system according to the present invention.

FIG. 7 shows an example of an oscillation device suited to a range finder system according to the present invention. In this drawing, 33 is a member to support one end of an elastic thin plate 34 forming a regular reflection mirror plane 34a by evaporating for example gold, alminium, etc. on its surface. And a permanent magnet 35 is fixed at a part of the thin plate 34. 36, 36' are iron cores being so positioned as corresponding to the permanent magnet 35 with very minute space and coils 37, 37' are wound around said iron core 36, 36', respectively. The coil 37 is connected to the base side of a transistor $Tr_1$, while the coil 37' is connected to the collector side of a transistor $Tr_2$. Now, explanation of the function of the oscillation device having above mentioned set-up will be made.

In FIG. 7, when a switch S is closed, base current flows by a power source E to the transistor $Tr_1$ through a resistance $VR_1$ and at the same time, current flows to the coil 37 magnetizing the iron core 36, thus the permanent magnet 35 is attracted. The magnetic field of the coil 37 increases and such current as corresponding to the base current of the transistor $Tr_1$ by induction electromotive force flows to the coil 37'. Then the thin plate 34 returns to its original state by its own elasticity and at the same time the permanent magnet 35 is then attracted to the iron core 36' being magnetized at the other side, but it tends to return to its original stationary position again, by the reduction in the collector current of the transistor $Tr_2$ through the reduction in the base current of the transistor $Tr_1$ and the elasticity of the thin plate 34 itself. However, the thin plate 34 at this time passes over its stationary position and approaches the iron core 36 again through the similar process as above. At this time, if the current of coil is increased by further stronger electromotive force, the amplitude of the thin plate 34 gradually increases and eventually goes into a stable oscillation state with a characteristic frequency. Said characteristic frequency is determined by relationship between the size, thickness of the thin plate 34 and the weight of the permanent magnet 35. Also, in the same drawing a diode D is for absorbing the reverse electromotive force of the coil 37', and a capacitor C is for preventing oscillation of the transistor $Tr_1$. Also the amplitude of the thin plate 34 can be varied by adjusting the resistance $VR_1$.

While in the example shown in FIG. 4, the reference pulse (FIG. 6(b)) is generated by a mechanical means from the oscillation of the thin plate 10, that is by the projection part 12a of the supporting member 12 and the switch 13 being closed thereby, naturally it is possible to generate reference pulse electrically without employing said mechanical means. Said electrical method will be now explained.

FIG. 8(a) through (d) are to show signal waveforms generated at each stage when reference pulse is generated by a driving circuit of the above mentioned oscillation device, wherein axis of abscissa shows time axis in all cases.

Figure 8:
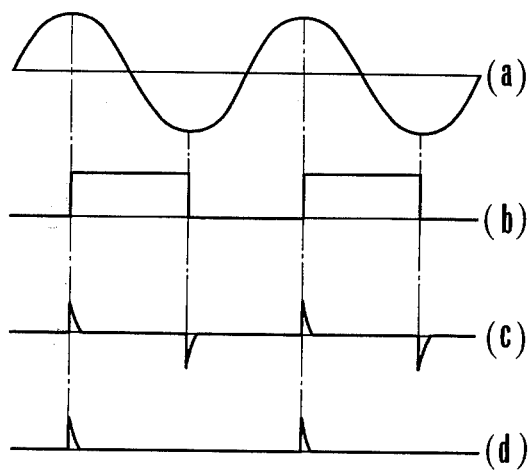
FIG. 8 is an output waveform diagram showing chronological change in output signal generated in process when reference signal is obtained from a driving circuit of the oscillation device shown in FIG. 7.

In FIG. 7, the electric potential at the output end, shown by $To$, of the transistor $Tr_1$ that is the waveform of the collector voltage of the transistor $Tr_1$ is as shown by (b) in FIG. 8. And when the permanent magnet 35 approaches the closest distance to the iron core 36 in the oscillation waveform of the thin plate 34 shown by (a), the collector current of the transistor $Tr_1$ starts flowing and the electric potential at $To$ point suddenly increases. After that said electric potential is retained almost at that value until the permanent magnet 35 makes the closest approach to the iron core 36', and the transistor $Tr_1$ is shifted to cut-off state at the time when the permanent magnet 35 makes the closest approach to the iron core 36', and the electric potential $To$ suddenly decreases and becomes zero. When such collector voltage is inputted into the differentiation circuit 71 in FIG. 7, the output of said differentiation circuit 71 becomes pulse with such waveform as shown by FIG. 8(c), and as said pulse (c) is rectified further by a rectifier circuit 72, pulse signal with such waveform as shown by (d) in FIG. 8 is obtained, thus such reference pulse as very precisely matching with the maximum swing position of the thin plate 34 can be obtained.

While the above shows such form that the thin plates (10, 34) having the mirror plane parts (10a, 34a) are oscillated with constant cycle and constant amplitude within radiation path thereby the radiation reflected from an object is intermittently incident into the photoelectric conversion element 9, as one example of the present invention, the method to have radiation intermittently incident into a photoelectric conversion element is not limited to said form, instead, similar effect can be obtained for example, by oscillating the photoelectric conversion element 9 itself within the radiation path or by oscillating the light receiving optical system 7 within the radiation path, and now explanations will be made on such latter methods.

Figure 9:
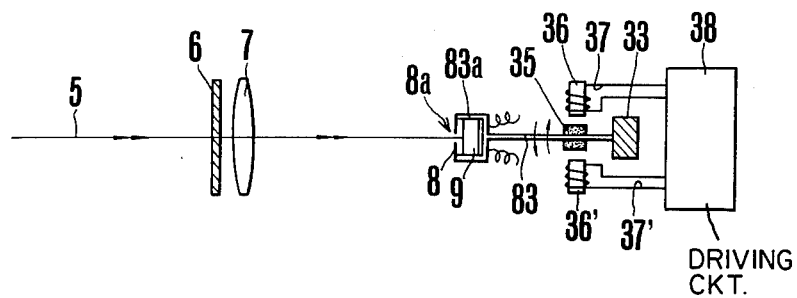
FIG. 9 is a schematic diagram to show partially only improved part to the example shown in FIG. 4, of another example of a range finder system according to the present invention.
Figure 10:
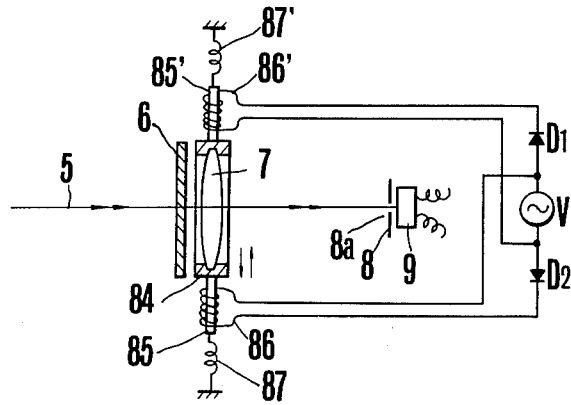
FIG. 10 is a schematic diagram to show partially improved part only to the example shown in FIG. 4, of another example of a range finder system according to the present invention.

FIG. 9 shows such example that the photoelectric conversion element 9 is oscillated in radiation path, while FIG. 10 shows such example that the light receiving optical system 7 is oscillated in radiation path, and both FIG. 9 and FIG. 10 show only the improved portions to the examples shown in FIG. 4 and FIG. 5.

In FIG. 9, 83 is a supporting member to support the photoelectric conversion element 9 and the mask 8 by its supporting part 83a, and it is provided in place of the thin plate 34 in the set-up of the oscillation device shown in FIG. 7. Therefore, in operation of the oscillation device, in similar manner as the thin plate 34 in the set-up of FIG. 7, it is oscillated holding the photoelectric conversion element 9 and the mask 8 integrally therewith with a constant cycle and a constant amplitude, and the photoelectric conversion element 9 is to receive intermittently the radiation reflected from an object through the slit part 8a of the mask 8. 38 shows a circuit block corresponding to the driving circuit of the oscillation device in the set-up of FIG. 7.

In FIG. 10, 84 is a lens barrel holding the light receiving optical system 7, and iron cores 85, 85' are fixedly provided at mutually opposing positions at external circumference of said lens barrel 84, wherein said iron cores 35, 35' go through coils 86, 86', respectively. 87, 87' are springs provided to bias the lens barrel 84 from opposing directions. Both of said coils 86, 86' are connected to an alternating current power source V and diodes $D_1$, $D_2$ are connected to the connecting paths thereof respectively as shown in the drawing. In said set-up, when alternating current is supplied from the power source V to the coils 86, 86', current flows to the coils 86, 86' by the action of the diodes $D_1$, $D_2$ according to change over of polarity of said current, and as the iron cores 85, 85' are attracted alternately by the magnetic power then generated at the coils, the lens barrel 84 is oscillated, therefore, the photoelectric conversion element 9 is to receive intermittently the radiation reflected from an object through the slit part 8a of the mask 8.

Next, explanations will be made on an example in which a range finder system according to the present invention is applied to an automatic focus adjustment device of a camera.

Figure 11:
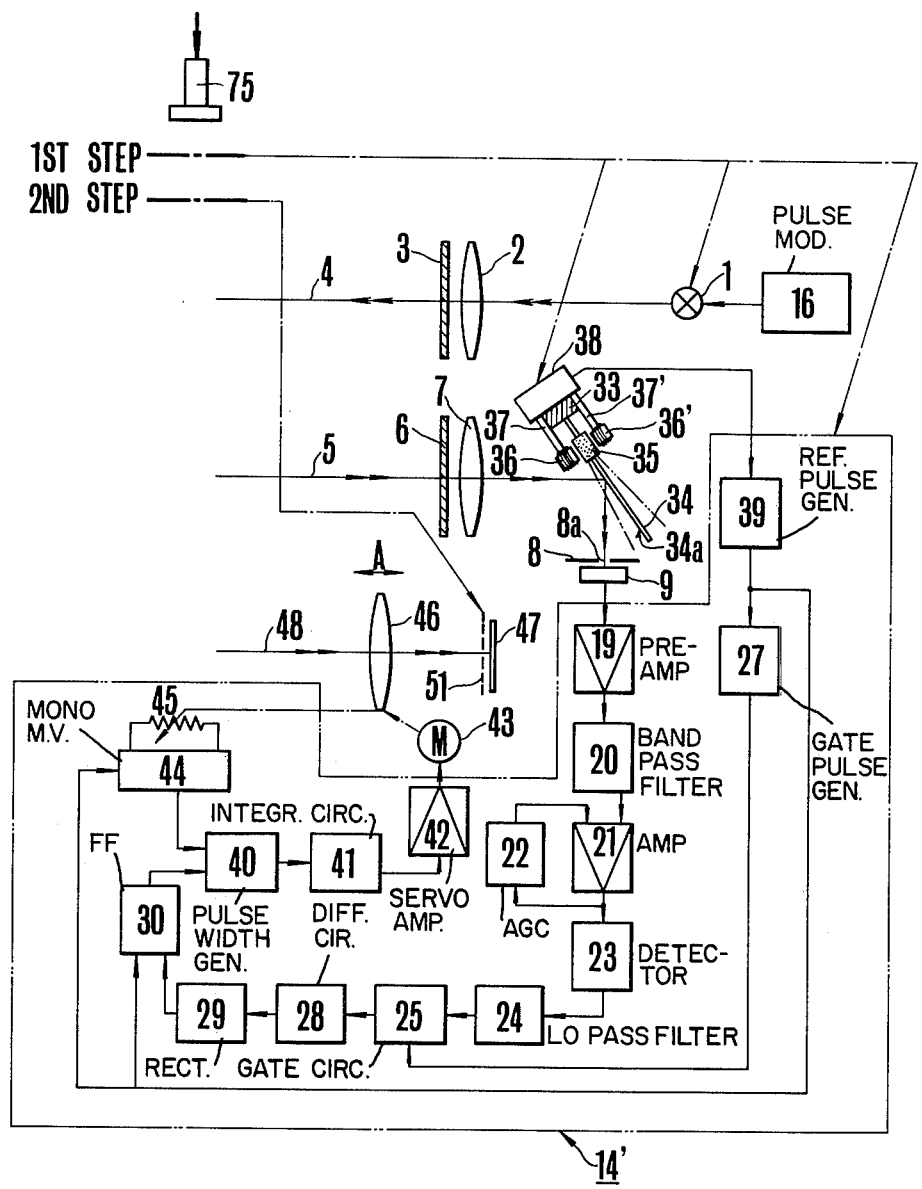
FIG. 11 is a schematic diagram to show set-up of important parts of an example of a range finder system according to the present invention as it is applied to an automatic focus adjustment device of a camera.

FIG. 11 is to show set-up of important parts of one example when an automatic focus adjustment device of a camera is made using a range finder system which has been explained above in detail. In the drawing, the set-up and function of component elements of the device shown with same identification numbers with those in FIG. 1, FIG. 4, FIG. 5 and FIG. 7 are exactly the same as what have been explained above. That is, an automatic focus adjustment device in this example is made by using the range finder system shown in FIG. 4 and FIG. 5 almost in the same manner, therefore explanations will be omitted for such portion as duplicating what have already been explained in so far as such omission will not hinder understanding of this example.

In FIG. 11, 38 is a circuit block equivalent to the driving circuit in the oscillation device shown in FIG. 7, and the process of generating reference pulse from said driving circuit 38 through a reference pulse generator 39 in a control circuit, total of which is enclosed and is shown by 14' will be as has been explained in FIG. 7 and FIG. 8.

46 is a photographing optical system having an optical axis 48, and 47 is a film. Said photographing optical system 46 is so made as can be shifted forward and backward in the direction of arrow A in FIG. 11 and is shifted by a mechanical means not being shown in the drawing according to the regular-reverse rotations of a servo-motor 43 which is controlled by final output of the control circuit 14'. Further a potentiometer 45 is attached to the photographing optical system 46 so that the resistance value or output voltage thereof varies depending on the position of the photographing optical system 46 at each instance. In the control circuit 14', 44 is a mono-stable multi-vibrator, and is activated by the reference pulse generated by the reference pulse generator 39, and generates pulse with such width as corresponding to the setting state of the potentiometer 45, that is, to the setting state in each instance of the photographing optical system 46. 40 is a pulse width operation device and said device 40 takes in as the input thereto simultaneously both of the output pulse of the flip-flop 30 that is the pulse to show distance to an object, and the output pulse of a mono-stable multi-vibrator 44, that is the pulse showing the position of the photographing optical system 46 at that time, and outputs pulse with such width as corresponding to the difference of the widths of said pulses. Therefore, the output pulse thus generated has such pulse width and polarity as corresponding to deviation between the distance to an object and the position of the photographing optical system 46.

41 is an integration circuit to integrate said output pulse, and 42 is a servo-amplifier to amplify the output of said integration circuit 41, further the above mentioned motor 43 is connected to the output end of the amplifier 42, therefore said motor 43 will have its rotating direction and rotation amount determined by the polarity and pulse width of the pulse outputted by said pulse width operation device 40. 47 is a film and 51 is an opening-closing member in a shutter of a conventionally known camera. 75 is a two-step operation release button and is so made that it initiates at its first step an automatic focus adjustment device that is the driving circuit 38 in the oscillation device, the control circuit 14' and the radiation source 1, and actuates the shutter in its second step. The broken lines in the drawing are to show the concept of said organic inter-related function.

Now the function of an automatic focus adjustment device with above mentioned set-up will be explained. When a user of a camera presses down the release button 75 first to its first step pointing his camera to an object desired, the oscillation device, the control circuit 14' and the radiation source 1 become ON and automatic focus adjustment function is initiated. That is in the control circuit 14', the reference pulse generator 39 generates reference pulse (for example, as shown by (d) in FIG. 8) based on the signal outputted from the driving circuit 38 of the oscillation device, and said reference pulse is inputted into each of the gate pulse generator 27 and the flip-flop 30 in same manner as mentioned above.

And when the radiation generated by the radiation source 1 is reflected by an object and said reflected radiation flux is reflected by the mirror plane part 34a of the thin plate 34 oscillating with a constant cycle and constant amplitude as mentioned above and is intermittently incident into the photoelectric conversion element 9 through the slit part 8a, a pair of such signals that their time interval corresponds to the distance to an object are generated on said photoelectric conversion element 9 in a same manner as mentioned above (as shown by (c) in FIG. 6) at each one cycle of the above mentioned thin plate 34. The output signal of the photoelectric conversion element 9 is processed in a same manner as in FIG. 5 and eventually supplied as reset signal to the flip-flop 30 by the rectifier circuit 29. And at this time, the pulse which is outputted by said flip-flop 30 and corresponds to the distance to an object (such pulse as shown by (i) in FIG. 6) is supplied to the pulse width operation device 40 as an object distance information.

On the other hand such output pulse of the mono-stable multi-vibrator 44 that its pulse width varies corresponding to the set position of the photographing optical system 46 by the potentiometer 45 is supplied to the pulse width operation device 40. Therefore, said pulse width operation device 40 takes in as input thereto both output pulses from the flip-flop 30 and from the mono-stable multi-vibrator 44, and outputs pulse with such polarity and width as corresponding to the difference between said both pulses that is corresponding to the deviation between the object distance and set position.

And a servo-motor 43 being drivingly connected to the photographing optical system 46 is rotated with its rotating direction and rotation amount determined by the polarity and the width of pulse outputted by the above mentioned pulse amplifier 40 and shifts the photographing optical system 46 to a focusing position to an object. As the photographing optical system 46 reaches the focusing position, the deviation between the object distance and the set position of the photographing optical system 46 in such state becomes zero, that is the width of pulse outputted by the mono-stable multi-vibrator 44 becomes equal to the width of output pulse from the flip-flop 30, therefore the output signal of the pulse width operation device 40 becomes zero, thus the motor 43 is stopped at this position, that is, the position where the photographing optical system 46 has its focus property adjusted against an object.

In this state, the image of an object becomes most distinctive on the film 47, therefore if the release button 75 is pressed down to its second step under said state, the shutter closing and opening member 51 is opened and closed and the most distinctive image of an object is recorded on the film 47.

When the pressing of the release button 75 is released upon completion of phtographing the projection of radiation from the radiation source 1 is stopped also the oscillation device stops its operation, further the control circuit 14' also becomes OFF, thus the automatic focus adjustment device stops its entire operation.

Figure 12:
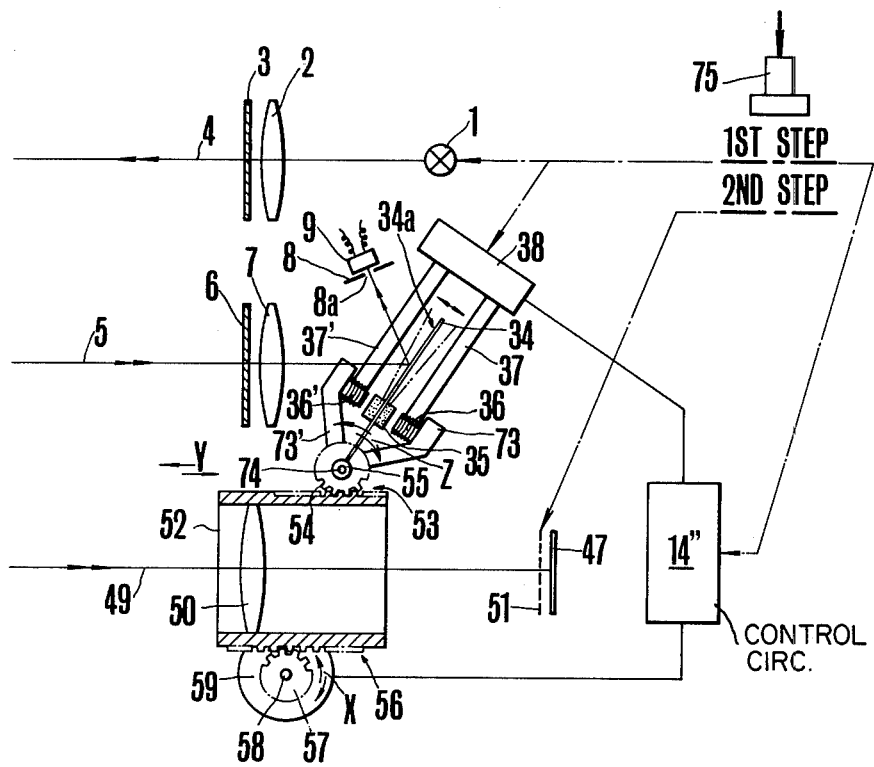
FIG. 12 is a schematic diagram to show set-up of another example of a range finder system according to the present invention as it is applied to an automatic focus adjustment device of a camera.
Figure 13:
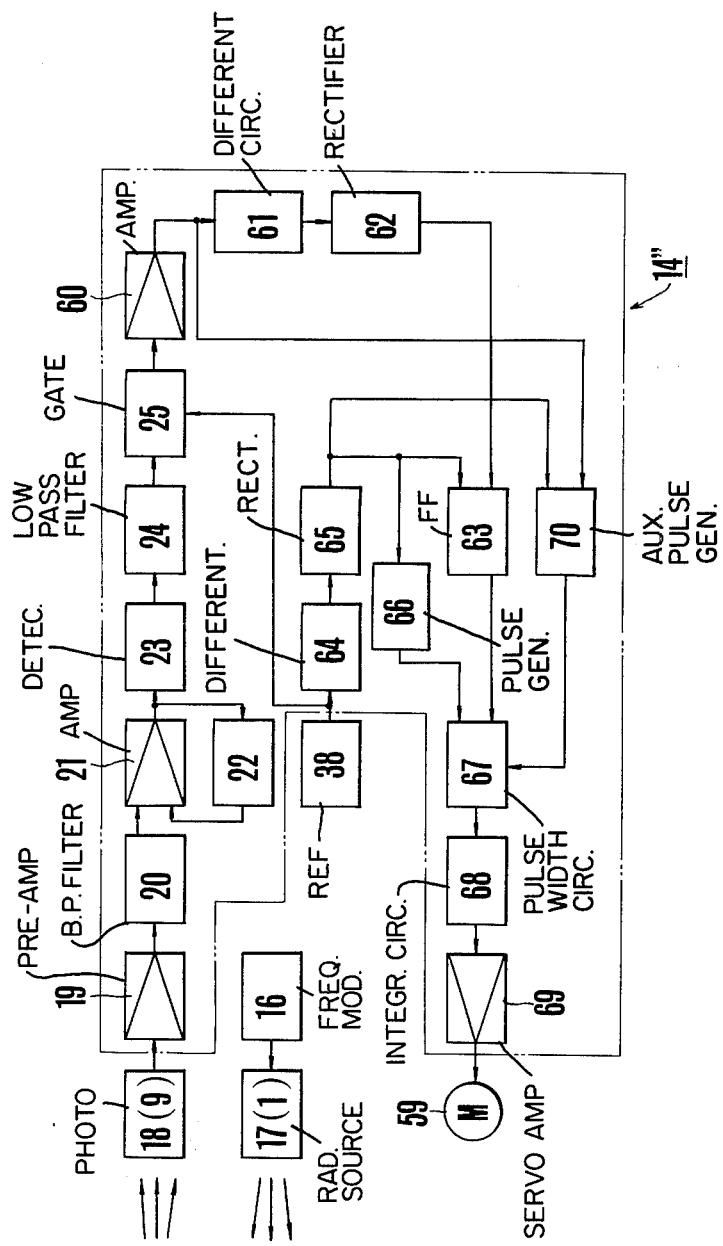
FIG. 13 is a block diagram to show details of an electric circuit of the automatic focus adjustment device shown in FIG. 12.

FIG. 12 and FIG. 13 illustrate another embodiment wherein an automatic focus adjustment device of a camera is controlled using the range finder system. In these drawings, elements having the same structures and functions as component elements of FIG. 1, FIG. 4, FIG. 5, FIG. 7 and FIG. 11 are identified with the same reference characters. That is, the automatic focus adjustment device of this example is constructed basically by using the range finder system shown in FIG. 4 and FIG. 5. Thus descriptions for duplicated portions are omitted without hindering the understanding of this example.

The characterizing point of the improvement in this example lies in such set-up of an automatic focus adjustment device that the position of entire oscillation device including a thin plate is rotatingly shifted depending on the setting state of a photographing optical system and as the thin plate of the oscillation device passes its stationary position (that is a neutral position) the radiation flux reflected by an object is irradiated onto a photoelectric conversion element, and at the same time, the image of said object is properly imaged on a film plane by a photographing optical system. That is, while time interval of a pair of signals generated by the oscillation of the thin plate 34 on the photoelectric conversion element 9 in each cycle of said oscillation is detected for sensing the distance to an object in the example shown in FIG. 11, the stationary position (that is neutral position) of the thin plate of the oscillation device is so rotatingly shifted that the time interval of a pair of output signals being outputted by a photoelectric conversion element becomes ½ of the oscillation cycle of the thin plate, and by having the rotating shifting of the oscillation device interrelated with the setting shifting of a photographing optical system, an automatic focus adjustment of said photographing optical system is achieved in this example.

Now, explanations of this example will be made based on said characterizing point.

In FIG. 12, the radiation flux, along the optical axis 5 after being reflected by an object, is reflected by a mirror surface 34a of an oscillating thin plate 34. It then intermittently strikes a photoelectric element 9. At this time, the entire oscillation device including the plate 34 is made so that its position is rotatingly shifted corresponding to the set state of a photographing optical system 50. That is, the thin plate 34 is fixedly supported on a supporting member 55 integrally mounted on a small gear 54 which is axially supported for rotation by a fixed axle 74 of a camera body not shown. The iron cores 36, 36' and the coils 37, 37' are fixed to supporting arms 73, 73' fixedly provided on the supporting member 55, therefore, as the gear 54 rotates around the axle 74 the entire oscillation device is rotatingly shifted around the axle 74 as shown by an arrow Z in the drawing. The photographic optical system 50 is held by a lens barrel 52 and is positioned along an optical axis 49. It is shiftable forward and backward as shown by arrow Y by engagement of a small gear 57 fitted around a motor axle 58 and a rack 56 on the external circumference of the lens barrel 52, along with the forward and reverse rotation (shown by arrow X in the drawing) of a motor 59 which is controlled by the output of a control circuit 14". A rack 53 is formed on the external circumference of the lens barrel 52 for engaging a small gear 54 integrally made with the supporting member 55 of the oscillation device. Thus the entire oscillation device is rotatingly shifted around the axle 74 depending on the forward and backward movement of the optical system 50. Details of the electric circuit of the device shown in FIG. 12 are shown in FIG. 13, in which the structure and function of each of the circuit components identified by numbers 16 to 25 are the same as those in FIG. 5.

An amplifier 60 serves to amplify the output of a low frequency pass filter 24 which passes a gate circuit 25. The output of the amplifier is applied to a flip-flop 63 as reset signal for the flip-flop after being differentiated and rectified through a differentiation circuit 61, and a rectifier circuit 62. Output waveform of the differentiation circuit 61 and the rectifier circuit 62 is similar as what is shown as in FIGS. 6(g) and 6(h) respectively. A differentiation circuit 64 and rectifier circuit 65 convert the collector voltage of transistor $Tr_1$ (shown in FIG. 7) in the driving circuit 38 to the shape shown by FIGS. 8(c) and 8(d). They apply these waveshapes to the flip-flop 63 as a reset signal of said flip-flop. It will be understood from what has been explained above that the output waveform of the flip-flop 63 has a pulse width corresponding to the distance to an object as shown by FIG. 6(i).

A reference pulse generation circuit 66 is triggered by the output pulse of the rectifier circuit 65, and is for example, in the form of a mono-stable multi-vibrator. It generates a pulse with a predetermined width (in this example the pulse with such width as corresponding to ¼ of the oscillating cycle of the thin plate 34).

A pulse width operation circuit 67 receive both the output pulse from the reference pulse generation circuit 66 and the output pulse from the flip-flop 63. It produces a pulse corresponding to the difference of said both pulses, that is a pulse corresponding to the deviation of the set-position of the optical system 50 to the distance to an object. The output pulse from said operation circuit 67 is, after suitably processed by the integration circuit 68, the servo-amplifier 69, supplied to the motor 59 as a control signal of said motor.

An auxiliary pulse generation circuit 70 receives output signals from the amplifier 60 and the rectifier circuit 65. It operates so that if the output of the rectifier circuit 65 is below a prescribed level, it is triggered by the output pulse from the rectifier circuit 65 to generate the pulse of predetermined width. That is, when the radiation flux relected by an object becomes weak for some reason and a distinct pulse sufficient to activate the flip-flop 63 can not be obtained, the pulse generation circuit 70 supplies an auxiliary pulse to the pulse width operation circuit 67 and sets the photographing optical system 50 at a position corresponding, for example, to an over-focus distance.

In this example, the variation in the collector voltage as shown by FIG. 8(b) of transistor $Tr_1$ (shown in FIG. 7) in the driving circuit 38 of such oscillation device is made as the gate signal input to the gate circuit 25 as it is to control ON.OFF of the gate of the gate circuit 25.

Next explanations will be made on the function of a device with above mentioned set-up.

When a camera user points his camera toward an object and press down the release button 75 to its first step, an automatic focus adjustment device starts operation in similar manner in the example shown in FIG. 11. The radiation flux generated by the radiation source 1 and reflected by and returned from an object intermittently strikes the photoelectric element 9 through the slit 8a by virtue of the oscillation function of the thin plate 34. This the photoelectric element 9 produces a signal containing object distance information as mentioned above. The signal is processed in similar manner as in the example shown in FIG. 5 and FIG. 11 in the control circuit 14″, and eventually supplied from the flip-flop 63 to the pulse width operation device 67 as an signal. The output pulse from said flip-flop 63 and the output pulse from the reference pulse generation circuit 66 are applied to the pulse width operation circuit 67 to conduct the operation, and a pulse having a polarity and width corresponding to the difference in both pulses is generated. Then the pulse is supplied to the motor 59 as a control signal through the integration circuit 68 and the servo-amplifier 69. At this time, said motor 59 has its rotating direction determined according to the polarity of said pulse.

The motor 59 drives the photographing optical system 50 based on the above mentioned control signal until the object image formed by said optical system is properly imaged on the film 47, that is until the entire oscillation device is rotatingly shifted to correspond to the shifting of the photographing optical system 50 and radiation flux reflected by an object strikes the photoelectric element 9 at a moment when the thin plate 34 in the oscillation device passes through its stationary position (neutral position). Thus a pulse with a width equal to the width of the pulse from the reference pulse generation circuit 66 is produced by the flip-flop 63 following same process mentioned above and thus the output of the pulse width operation circuit 67 becomes zero.

When the output pulse from the flip-flop 63 equals the output pulse from the reference pulse generator 66, the output of the pulse width circuit 67 becomes zero. This stops the motor. The object image on the film 47, formed by the photographic optical system 50, is then most distinct.

When the release button 75 is pressed down to its second step, the shutter member 51 opens and closes to take a picture. When the release button 75 is released, the automatic focus adjusting device ceases operation.

In this example, the entire oscillating device is rotated according to the state of the photographic optical system 50. According to another embodiment of the invention, the light receiving optical system 7 is shifted perpendicular to the optical axis 5 in response to the position of the photographic optical system 50 while the oscillating device remains fixed. According to another embodiment of the invention, the photoelectric conversion element itself is shifted by the system 50 to perform a similar function.

Figure 14:
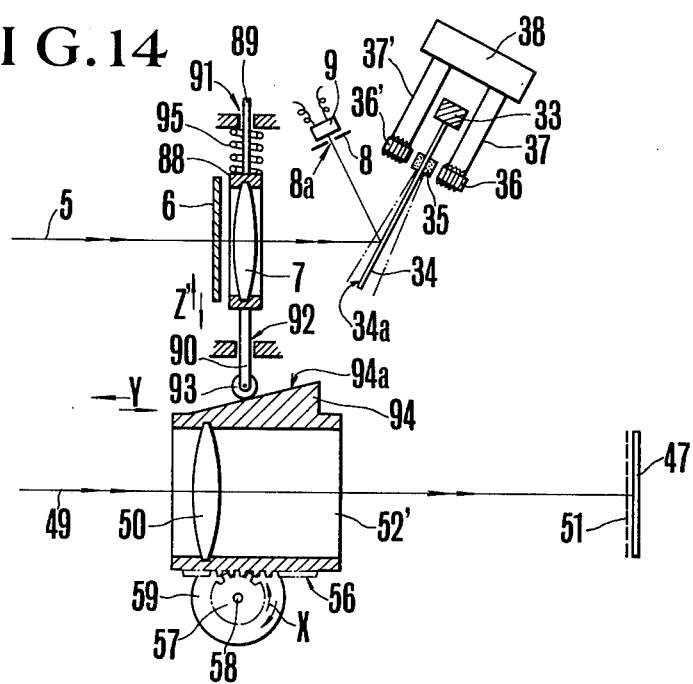
FIG. 14 is a schematic diagram to show partially improved part only to the set-up shown in FIG. 12, particularly of a modified example for the embodiment patterns of an automatic focus adjustment device shown in FIG. 12 and FIG. 13.
Figure 15:
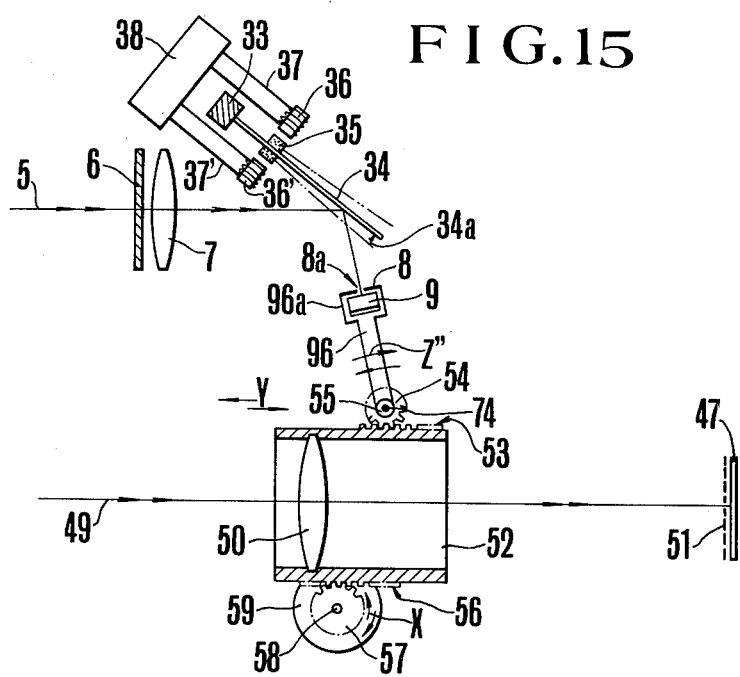
FIG. 15 is a schematic diagram to show partially improved part only to the set-up shown in FIG. 12 particularly of a modified example in the automatic focus adjustment device shown in FIG. 12 and FIG. 13.

FIG. 14 and FIG. 15 show modified examples based on these concepts. In FIG. 14, the light receiving optical system 7 is shifted perpendicular to the optical axis 5 of the photographing optical system 50 in correspondence with the setting of said system 50, while FIG. 15 shows that the photoelectric conversion element 9 is shifted in correspondence with the setting of the photographing optical system 50. Both FIG. 14 and FIG. 15 show partially the improved parts to the set-up of the device shown in FIG. 12.

In FIG. 14, a lens barrel 88 holds the light receiving optical system 7 and includes a pin 89 and a rod 90. The pin 89 passes through a guide hole 91 and the rod 92 passes through a guide hole 90. Thus the barrel 88 can be shifted vertically, perpendicular to the optical axis 5 of the light receiving system 7 as shown by the arrow Z′ in the drawing. A cam follower 93 mounted at the bottom of the rod 90 contacts a cam surface 94a of a cam 94 on the upper part of the lens barrel 52′ that holds the optical system 50. A spring 95 biases the cam follower 93 into contact with the cam surface 94a of the cam 94. The spring 95 assures that the cam follower 93 follows the cam surface 94a. Other than that, the remaining parts of FIG. 14 correspond to those in FIG. 12.

In the set-up mentioned above, when the motor 59 rotates in correspondence with the distance to an object, the photographing optical system 50, and at this time, the light receiving optical system 7 is shifted by the above mentioned set-up to a direction vertical to its optical axis in correspondence with the setting state of the above mentioned photographing optical system 50.

Thus varies the incident path of radiation into the photoelectric conversion element 9. Thus a similar effect is obtained as in the device shown in FIG. 12 by rotating the entire oscillation device in correspondence with setting of the photographing optical system.

In FIG. 15, a supporting arm 96 utilizes a supporting part or member 96a to hold the photographic transducing element 9 and the mask 8 integrally. The arm 96 is fixed to a supporting member 55 integral with a gear 54. The supporting arm rotates with longitudinal movement of the lens barrel 52. Rotation occurs along an arrow Z" about an axle 74 by virtue of the rotation of the small gear 54 around the axle during shifting of the lens barrel 52. The other parts not particularly explained here correspond to those shown in FIG. 12. Therefore, as the motor 59 rotates on the basis of the distance to an object, the optical system 50 is shifted. At this time, the photographic conversion element 9 and the mask 8 are rotated integrally by the aforementioned system around an axle 74 on the basis of the optical system 50. This varies the radiation path to the element 9. The effect obtained corresponds substantially to the one obtained in the devices shown in FIG. 12 and 14.

Figure 16:
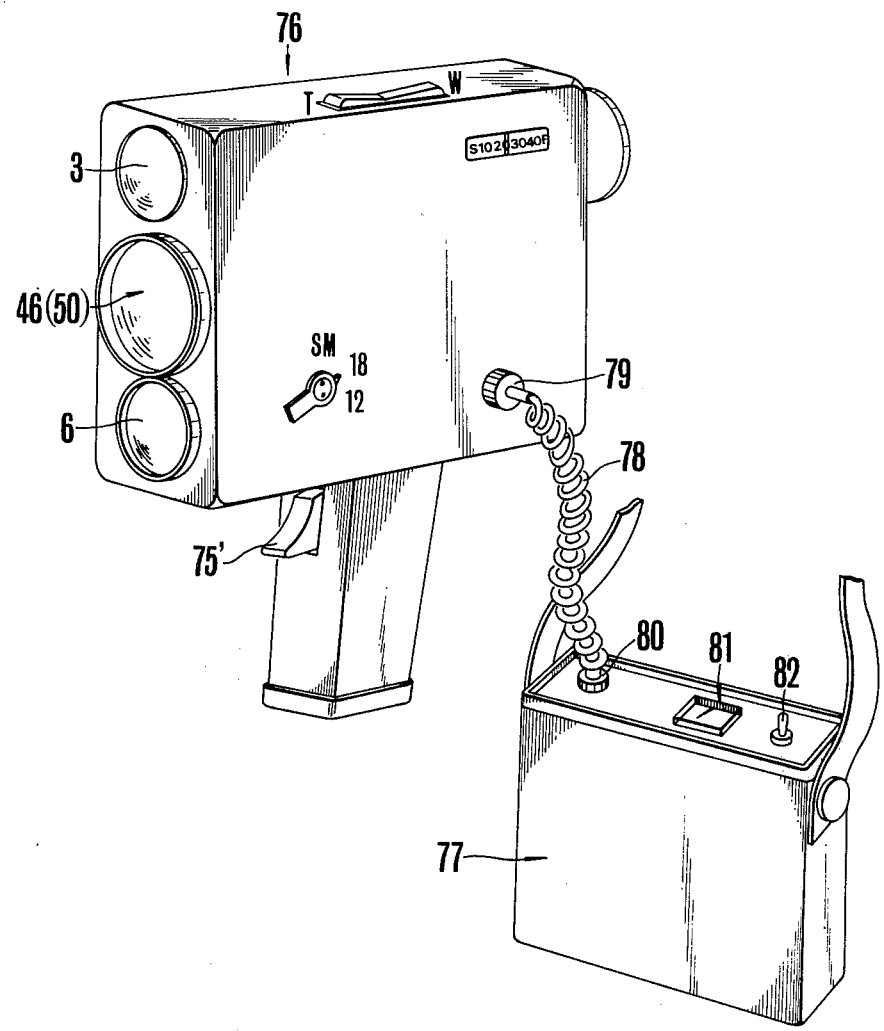
FIG. 16 is an oblique view to show an external appearance of a motion picture camera system having an automatic focus adjustment device as shown in FIG. 11 to FIG. 15 employing a range finder system according to the present invention.

FIG. 16 shows the external appearance of an entire motion picture camera system having an automatic focusing adjustment device as shown in FIGS. 11 to 15 using a rangefinder system embodying features of the present invention. A camera 76 has an automatic focus adjusting device as shown in FIGS. 11 to 15 incorporated therein. The camera release button 75' utilizes a two-step operation. Here the radiation generating source 1 is triggered during the fist step to generate radiation. A shutter not shown in the drawing can be activated during the second step of the release button. A power source 77 supplies power to an automatic focus adjustment device which is incorporated into the aforementioned camera 76. The power source 77 and the camera are electrically connected by a connecting cord 78. Couplers 78 and 90 couple the cord 78 to the camera 76 as the power supply 77.

Power supplied to an automatic focusing adjustment device within the camera 76 by closing a power source switch 82 to initiate the operation of the oscillation device and the control circuit. A battery checker 81 checks the power source.

When the camera system shown in this FIG. 16 is used, after connecting the camera 76 and the power source device 77 by the cord 78, the power source switch 82 is closed. Within the automatic focus adjustment device within the camera 76, this first turns on the driving circuit 38 in the oscillating device (shown in FIG. 11 to FIG. 15) and then turns on the control circuit 14' (shown in FIG. 9) or 14" (shown in FIG. 10 and FIG. 11). And after the oscillation of the thin plate 34 (shown in FIG. 11 to FIG. 15) enters into stabilized state, the camera 76 is pointed to an object and the release button 75' is pressed down to its first step. Power is then supplied to the radiation source 1 (shown in FIG. 9 and FIG. 10) by the power source 77 to generate radiation, which is projected onto an object through the filter 3. The radiation flux reflected by and returned from an object is incident into the camera 76 through the filter 6. This starts an automatic focus adjustment operation in the optical system 46(50) in a similar manner as described. And as the release button 76 is pressed down to its second step in a state wherein the photographing optical system 46(50) has its focus properly adjusted toward an object, the shutter is activated in a conventionally known manner to photograph.

As has been explained above in a range finder system according to the present invention, the radiation flux which is generated by a radiation source and is reflected by and returned from an object is irradiated intermittently onto a photoelectric conversion element by the action of an oscillation device, and a time series signal corresponding to an object distance is obtained by said photoelectric conversion element. Therefore, distinct output signals can be obtained as long as the intensity of radiation on the photoelectric conversion means of the radiation flux is at a marginal intensity of radiation which is able to be detected by a photoelectric conversion means. Therefore, the radiation output of a radiation generation source can be small. It exhibits the advantage that its power consumption can be small. It also has the advantage that its sensing accuracy is almost constant irrespective of the radiation reflecting power of an object, because the incident time interval of a radiation pulse only is detected.

Also in a range finder system according to the present invention, the output signal of the photoelectric conversion means can be easly converted into pulses. Therefore various electric processes can be done with high signal versus noise ratio (S/N ratio). Thus the accuracy in focusing point detection of camera or at the time of detection of an object distance in an automatic focus adjustment device, etc., and the accuracy in an automatic focus adjustment of a photographing optical system can be further enhanced.

When, a range finder system according to the present invention employs set-up principle as described in detail, the response characteristics to a sensing object are very satisfactory and the system can quickly respond to a moving object. Thus an automatic focus adjustment device employing a range finder system according to the present invention is quite suitable not only for an ordinary photographic camera but for a motion picture camera which has many opportunities to photograph moving objects or for a TV camera.

Also, while FIG. 11 to FIG. 15 show examples in which a range finder system according to the present invention is applied to an automatic focus adjustment device of a camera, it can be easily applied to a so-called focus detection device in which only the focusing position of a photographing optical system is simply determined. (Of a total 27 claims, independent claims are 8 claims, that is, 1, 10, 16, 23, 24, 25, 26 and 27)

What is claimed is:

1. A system for setting an imaging optical system along an optical axis so as to adjust the focus of the optical system to an object, comprising:
   projecting means for projecting a beam of radiant energy toward said object,
   beam receiving optical means offset from said projecting means for receiving the beam reflected by the object at an angle depending upon the distance to the object from the projecting means and for forming a beam path depending upon the angle,
   sensing means positioned in the path of the beam from the receiving optical means for sensing the reflected beam and producing an electrical signal in response thereto,
   oscillating means for cyclically varying the mutual relationship between the sensing means and the path of the beam toward the sensing means and for intermittently diverting the reflected beam from the sensing means and directing it toward the sensing means so that the sensing means produces intermittent signals during each cycle of the oscillating means at a time interval responsive to the distance to the object from the projecting means, reference signal generating means for generating reference signals at a predetermined time interval, and adjusting means operatively coupled to said imaging optical system for substantially continuously varying the mutual relationship between said sensing means and the path of the beam toward the sensing means on the basis of the change of position of said optical system along the optical axis, said sensing means producing the signals having a time interval corresponding to the deviation of the set position of the optical system along the optical axis from a focused position at which the optical system is properly focused on the object, said adjusting means adjusting the time interval of the output signals of the sensing means until the time interval of the output signals of the sensing means has a predetermined relationship to the time interval of the reference signals generated by the reference signal generating means.

2. A system as in claim 1, wherein
said oscillating means includes oscillatory optical means for cyclically varying the path of the beam toward the sensing means, said oscillatory optical means being positioned in the path of the beam from said projecting means to said sensing means.

3. A system as in claim 2, wherein said oscillatory optical means includes:
a beam deflecting member for cyclically deflecting the reflected beam in the beam path formed by the receiving optical means, said sensing means producing said intermittent signals in response to the beam cyclically deflected by said deflecting member.

4. A system as in claim 3, in which said deflecting member is an oscillating mirror.

5. A system as in claim 2, wherein said adjusting means is operatively coupled to said oscillatory optical means for shifting said oscillatory optical means in correspondence with the change of the position of said imaging optical system along the optical axis, the mutual relationship between said sensing means and the path of the beam toward the sensing means being substantially continuously varied in accordance with the shifting of the oscillatory optical means corresponding to the change of the position of the optical system along the optical axis.

6. A system as in claim 3, wherein said adjusting means is coupled to said deflecting member to shift said deflecting member within the path of the beam in correspondence with the position of the imaging optical system along the optical axis, the mutual reletiohship between said sensing means and the path of the beam in accordance with the shifting of the deflecting member corresponding to the change of the position of the optical system along the optical axis.

7. A system as in claim 1, wherein said adjusting means is operatively connected to said sensing means for shifting said sensing means in a direction angular to the path of the beam toward said sensing means in correspondence with the change of the position of the optical system along the optical axis so that the mutual relationship between said sensing means and the path of the beam toward said sensing means is substantially continuously varied on the basis of the change of the position of the imaging optical system along the optical axis.

8. A system as in claim 1, wherein said beam receiving optical means has an optical axis, and wherein said adjusting means is operatively coupled to said receiving optical means to shift said receiving optical means in a direction substantially perpendicular to said axis in correspondence with the change of the position of the imaging optical system along its optical axis, the mutual relationship between the sensing means and the path of the beam toward said sensing means being substantially continuously varied in accordance with the shifting of the beam receiving optical means corresponding to the change of the position of the imaging optical system along the optical axis.

9. A system as in claim 8, wherein said beam receiving optical means includes means for deflecting the reflected beam and for substantially continously varying the mutual relationship between the sensing means and the path of the beam toward said sensing means.

10. a system as in claim 9, wherein said receiving optical means includes a lens member for converging the reflected beam into one point.

11. A system as in claim 1, wherein the reference signal generating means is operatively coupled to said oscillating means to generate the reference signals based on the oscillatory action of said oscillating means.

12. A system as in claim 11, further comprising: driving means operatively connected to said imaging optical system for driving the optical system along said optical axis, and control circuit means electrically connected with said sensing means as well as said reference signal generating means and the driving means to control the driving means on the basis of the difference between the time interval of the output signals of the sensing means and the time interval of the reference signals generated by the reference signal generating means, said circuit means comparing the time interval of the output signals of said sensing means with the time interval of the reference signals and stopping said driving means when the time interval phase of the output signals of said sensing means has a predetermined relationship with the time interval of the reference signals.

13. An automatic focusing system comprising:
an image forming optical system having an optical axis and being movable along the axis to form an image of an object at a predetermined position, driving means operatively coupled to said optical system for driving said optical system along the optical axis, beam projecting means for projecting a light beam toward said object, beam receiving optical means offset from the projecting means for receiving the light beam reflected by the object at a position offset from the projecting means so that the reflected beam impinges on the position at an angle depending upon the distance to the object from the projecting means for forming a beam path depending upon the angle, light sensing means located to receive the reflected beam through said receiving optical means for producing an electrical signal in response to the reflected beam, oscillating means for cyclically varying the mutual relationship between the sensing means and the path of the beam toward the sensing means and for intermittently directing the reflected beam to the sensing means so that said sensing means produces intermittent signals in response to said oscillating means, reference signal generating means for generating reference signals at a predetermined time interval, adjusting means operatively coupled to said image forming optical system for substantially continuously varying the mutual relationship between the sensing means and the path of the beam toward the sensing means in accordance with the change of the position of the image forming optical system along the optical axis so that said sensing means produces the signals at a time interval corresponding to the deviation of the set position of said image forming optical system along the optical axis from a focused position at which the optical system would form the image of the object at the predetermined position, and control circuit means electrically connected with said driving means and said sensing means as well as said reference signal generating means for comparing the time interval of the output signals of said sensing means with the time interval of the reference signals generated by the reference signal generating means so as to stop said driving means when the time interval of the output signals of said sensing means has a predetermined relationship with the time interval of the reference signal.

14. A system as in claim 13, wherein said oscillating means includes:

oscillatory optical means disposed in the path of the beam from said projecting means to said sensing means for cyclically varying the path of the beam toward said sensing means.

15. A system as in claim 14, wherein said oscillatory optical means includes:

a beam deflecting member disposed in the path of the beam formed by said receiving optical means, said beam deflecting member being oscillatory, said sensing means producing said intermittent signals in response to the beam cyclically deflected by said beam deflecting member.

16. A system as in claim 15, wherein said oscillatory beam deflecting member is an oscillating mirror.

17. A system as in claim 15, wherein said adjusting means is operatively coupled to said oscillatory beam deflecting member for shifting said deflecting member within the beam path in correspondence with the change of the position of the image forming optical system along the optical axis, the mutual relationship between said sensing means and the path of the beam toward the sensing means being substantially continuously varied in accordance with the shifting of the deflecting member corresponding to the change of the position of the optical system along the optical axis.

18. A system as in claim 14, wherein said adjusting means is operatively coupled to said oscillatory optical means for shifting said oscillatory optical means in correspondence with the change of the position of the image forming optical system along the optical axis, the mutual relationship between the sensing means and the path of the beam toward said sensing means being substantially continuously varied in accordance with the shifting of the oscillatory optical means corresponding to the change of position of the image forming optical system along the optical axis.

19. A system as in claim 13, wherein said adjusting means is operatively coupled to said sensing means for shifting said sensing means in a direction angular to the path of the beam toward said sensing means in accordance with the change of the position of the imaging optical system along the optical axis so that the mutual relationship between said sensing means and the path of the beam toward said sensing means is substantially continuously varied in accordance with the change of the position of the image forming optical system along the optical axis.

20. A system as in claim 13, wherein said receiving optical means has an optical axis, and wherein said adjusting means is operatively coupled to said receiving optical means for shifting said receiving optical means in a direction angular to said optical axis in correspondence with the change of the position of the image forming optical system along the optical axis, the mutual relationshiop between said sensing means and the path of the beam toward said sensing means being substantially continuously varied in accordance with the shifting of the receiving optical means corresponding to the change of the position of the image-forming optical system along the optical axis.

21. A system as in claim 20, wherein said receiving optical means includes means for deflecting the reflected beam and for substantially continuously varying the mutual relationship between the sensing means and the path of the beam toward said sensing means.

22. A system as in claim 21, wherein said receiving optical means includes a convergent lens member to converge the reflected beam into one point.

23. A system as in claim 13, wherein said reference signal generating means is operatively coupled with the oscillating means to generate the reference signals based upon the oscillatory action of said oscillating means.

24. An automatic focusing system comprising:

an image forming optical system having an optical axis and being movable along the axis to form an image of an object at a predetermined position, driving means operatively coupled to said optical system for driving the optical system along the optical axis, ray projecting means for projecting a radiant ray toward said object, ray receiving optical means offset from said projecting means for receiving the radiant ray reflected by the object at a position offset from the projecting means so that the reflected ray impinges on the position at an angle depending upon the distance to the object from the projecting means and forming a ray path depending upon the angle, sensing means located to receive the reflected ray through the receiving optical means for sensing the reflected ray, said sensing means producing an electrical signal in response to the reflected ray, oscillatory optical means positioned within the path of the ray from the projecting means to said sensing means for cyclically varying the path of the reflected ray toward the sensing means to intermittently direct the reflected ray to said sensing means, said oscillating optical means being operatively coupled to said image forming optical system for continuously shifting within the path of the ray in accordance with the change of the position of the image forming optical system along the optical axis, said sensing means producing the signals at a time interval corresponding to the deviation of the set position of the image forming optical system from a focused position at which the image forming optical system would assume to form the image of the object at the predetermined position, reference signal generating means for generating reference signals at a predetermined time interval, control circuit means electrically connected with said sensing means and said reference signal generating means and the driving means for responding to the output signals of said sensing means and comparing the time interval of the output signals of said sensing means with the time interval of the reference signals generated by the reference signal generating means so as to stop the driving means when the time interval of the signal from said sensing means assumes a predetermined relationship with the time interval of the reference signals.

25. An automatic focusing system comprising:

an image forming optical system having an optical axis and being movable along the axis to form an image of an object at a predetermined position, driving means operatively coupled to said optical system for driving the optical system along the optical axis, ray projecting means for projecting a radiant ray toward the object, ray receiving optical means offset from said projecting means for receiving the radiant ray reflected by the object at a position offset from the projecting means so that the reflected ray impinges on the position at an angle depending upon the distance to the object from the projecting means and for forming a ray path depending upon the angle, sensing means located to receive the reflected ray through said receiving optical means for sensing the reflected ray, said sensing means producing an electrical signal in response to the said reflected ray and being operatively connected to said image forming optical system so as to be shifted in accordance with the change of the position of said optical system along said optical axis, oscillatory optical means positioned within the path of the ray from the projecting means to the sensing means for cyclically varying the path of the ray toward said sensing means, said sensing means producing the signals having a time interval corresponding to the deviation of the set position of the image forming optical system from a proper focusing position of the optical system, reference signal generating means for generating reference signals having a predetermined time interval, control circuit means electrically coupled to said sensing means and said reference signal generating means and the driving means for responding to the outout signals of said sensing means and comparing the time interval of the signals from said sensing means with the time interval of the reference signal so as to stop the driving means when the time interval of the signals from said sensing means assumes a predetermined relationship with the time interval of the reference signals.

26. An automatic focusing system comprising:

an image forming optical system having a first optical axis and being movable along the first optical axis to form an image of an object at a predetermined position, driving means coupled to said optical system for driving the optical system along the first optical axis, ray projecting means for projecting a radiant ray toward the object, ray receiving optical means offset from said projecting means for receiving the radiant ray reflected by the object at a position offset from the projecting means so that the reflected ray impinges on the position at an angle depending upon the distance to the object from the projecting means and for forming a ray path depending upon the angle, said ray receiving optical means having a second optical axis and being operatively connected to said image forming optical system so as to be shifted in a direction angular to the second optical axis in accordance with the change of the position of the image forming optical system along the first optical axis and thereby shift the ray path, sensing means located to receive the reflected ray through said receiving optical means for sensing the reflected rays, said sensing means producing an electrical signal in response to the reflected ray, oscillatory optical means positioned within the path of the ray from the projecting means to the sensing means for cyclically varying the path of the reflected ray toward said sensing means, said sensing means producing the signals having a time interval corresponding to the deviation of the set position of the image forming optical system from a proper focusing position of the optical system by the operations of said oscillatory optical means and said receiving optical means, reference signal generating means for generating reference signals at a predetermined time interval, control circuit means electrically coupled to said sensing means and said reference signal generating means and the driving means for responding to the output signals of said sensing means and comparing the time interval of the signals from said sensing means with the time interval of the reference signals so as to stop the driving means when the time interval of the signals from said sensing means assumes a predetermined relationship with the time interval of the reference signals.

27. An automatic focusing system comprising:

an image forming optical system having an optical axis and being movable along the axis to form an image of an object at a predetermined position, driving means coupled to said optical system for driving the optical system along the optical axis, ray projecting means for projecting a radiant ray toward the object, ray receiving means offset from said projecting means for receiving the radiant ray reflected by the object at a position offset from the projecting means so that the reflected ray impinges on the position at an angle depending upon the distance to the object from the projecting means and for forming a ray path depending upon the angle, ray deflecting optical means positioned within the path of the reflected ray and operatively connected to said image forming optical system so as to shift the ray path in accordance with the change of the position of the image forming optical system along said optical axis, oscillating means operatively coupled to said deflecting optical means for oscillating said deflecting optical means at a predetermined frequency, sensing means positioned to receive the reflected ray through the ray deflecting optical means for sensing the reflective ray, said sensing means producing output signals at a time interval corresponding to the deviation of the set position of the image forming optical system from a properly focused position at which the optical system would form the image of the object at the predetermined position, reference signal generating means operatively coupled to said oscillating means to generate reference signals at a prescribed time interval on the basis of the oscillation function of said oscillating means, control circuit means electrically coupled to said sensing means and said reference signal generating means and the driving means for responding to the output signals of said sensing means and comparing the time interval of the signals from said sensing means with the time interval of the reference signals so as to stop the driving means when the time interval of the signals from said sensing means assumes a predetermined relationship with the time interval of the reference signals.

28. An automatic focusing system comprising:

an image forming optical system having an optical axis and being movable along the axis to form an image of an object at a predetermined position, driving means operatively coupled to said optical system for driving the optical system along the optical axis, ray projecting means for projecting a radiant ray toward the object, ray receiving means offset from said projecting means for receiving the radiant ray reflected by the object at a position offset from the projecting means so that the reflected ray impinges on the position at an angle depending upon the distance to the object from the projecting means and for forming a ray path depending upon the angle, ray deflecting optical means positioned within the path of the reflected ray for deflecting the reflected ray passing through the ray receiving means, oscillating means operatively coupled to said deflecting optical means for oscillating said deflecting optical means at a predetermined frequency, ray sensing means located to receive the reflected ray through said ray deflecting optical means for sensing the reflected ray and operatively coupled to said image forming optical system so as to be shifted in accordance with the change of the optical system, said sensing means producing electrical signals having a time interval corresponding to the deviation of the set position of the image forming optical system from a properly focused position at which the image forming optical system would form the image of the object at the predetermined position, reference signal generating means operatively coupled to said oscillating means to generate reference signals at a prescribed time interval on the basis of the oscillation function of said oscillating means, and control circuit means electrically coupled to said sensing means and said reference signal generating means and said driving means for comparing the time interval of the output signals of said sensing means with the time interval of the reference signals generated by the reference signal generating means so as to stop the driving means when the time interval of the output signals of the sensing means assumes a predetermined relationship with the time interval of the reference signals.

29. An automatic focusing system comprising:

an image forming optical system having a first optical axis and being movable along the first optical axis to form an image of an object at a predetermined position, driving means operatively coupled to said optical system for driving the optical system along the first optical axis, ray projecting means for projecting a radiant ray toward the object, ray receiving means offset from said projecting means for receiving the radiant ray reflected by the object at a position offset from the projecting means so that the reflected ray impinges on the position at an angle depending upon the distance to the object from the projecting means and for forming a ray path depending upon the angle, ray deflecting optical means positioned within the path of the reflected ray for deflecting the reflected ray passing through the receiving optical means, said ray receiving optical means having a second optical axis and being operatively connected to said image forming optical system so as to be shifted in a direction angular to the second optical axis in accordance with the change of the position of the image forming optical system along the first optical axis and thereby shift the ray path, oscillating means operatively coupled to said deflecting optical means for oscillating said deflecting optical means at a predetermined frequency, sensing means positioned to receive the reflected ray through said deflecting optical means for sensing the reflected ray, said sensing means producing electrical signals having a time interval corresponding to the deviation of the set position of said image forming optical system from a properly focused position at which the optical system would form the image of the object at the predetermined position, reference signal generating means operatively coupled to said oscillating means to generate reference signals at a prescribed time interval on the basis of the oscillation function of said oscillating means, control circuit means electrically coupled to said sensing means and said reference signal generating means and the driving means for responding to the output signals of said sensing means and comparing the time interval of the signals from said sensing means with the time interval of the reference signals so as to stop the driving means when the time interval of the signals from said sensing means assumes a predetermined relationship with the time interval of the reference signals.

30. A focusing device for adjusting the focus of an imaging optical system which is movable along an optical axis so as to form an image of an object at a predetermined position, comprising:

ray projecting means for projecting a radiant ray toward said object, ray receiving optical means offset from said projecting means for receiving the reflected ray reflected by the object so that the reflected ray impinges on the position at an angle depending upon the distance to the object from the projecting means and for forming a ray path depending upon the angle, sensing means positioned to receive the reflected ray through said ray receiving optical means for sensing the reflected ray, said sensing means producing an electrical signal in response to the reflected ray, oscillating optical means disposed in the path of the reflected ray for cyclically varying the mutual relationship between said sensing means and the path of the ray toward said sensing means, said oscillating optical means having substantially one oscillation center, said sensing means producing intermittent signals by the operation of said oscillating optical means, reference signal generating means for generating reference signals at a prescribed time interval, and adjusting means for substantially continuously varying the mutual relationship between the oscillation center of said oscillating optical means and the path of the ray toward said sensing means according to the change of the position of the imaging opitcal system along the optical axis, said sensing means producing the signals having a time interval corresponding to the deviation of the set position of the imaging optical system from a properly focused position at which the imaging optical system would form the object image at said predetermined position, whereby the focusing of the optical system to the object is achieved by adjusting the time interval of the output signals of the sensing means until the time interval of the output signals of the sensing means has a predetermined relationship to the time interval of the reference signals generated by the reference signal generating means, by means of the adjusted means.

31. An automatic focusing device for adjusting the focus of an imaging optical system which is movable along an optical axis so as to form an image of an object at a predetermined position, comprising:

ray projecting means for projecting a radiant ray toward said object, ray receiving optical means offset from the projecting means for receiving the radiant ray reflected by the object so that the reflected ray impinges on the position at an angle depending upon the distance to the object from the projecting means and for forming a ray path depending upon the angle, sensing means positioned to receive the reflected ray through said ray receiving optical means for sensing the reflected ray, said sensing means producing an electrical signal in response to the reflected ray, oscillatory optical means disposed in the path of the ray toward said sensing means for cyclically varying the mutual relationshiop between the sensing means and the ray path toward said sensing means, said oscillatory optical means having substantially one oscillation center, said sensing means producing intermittent signals by the operation of said oscillatory optical means, reference signal generating means for generating reference signals having a predetermined time interval, adjusting means operatively coupled to the imaging optical system and said oscillatory optical means for substantially continuously shifting the oscillation center of the oscillatory optical means in accordance with the change of the position of the imaging optical system along the optical axis, said sensing means producing the signals at a time interval corresponding to the deviation of the set position of the imaging optical system from a properly focused position at which the optical system would form the image of the object at said predetermined position, driving means for operatively coupled to said imaging optical system for driving the optical system along the optical axis, and control circuit means electrically connected with said sensing means as well as said reference signal generating means and the driving means to control the driving means on the basis of the difference between the time interval of the output signals of the sensing means and the time interval of the reference signals generated by the reference signal generating means, said circuit means comparing the time interval of the output signals of said sensing means with the time interval of the reference signals and stopping said driving means when the time interval of the output signals of said sensing means has a predetermined relationship with the time interval of the reference signals.

32. A focusing device for focusing an objective lens means to an object, said lens means having an optical axis and being adjustable along the optical axis so as to focus to said object, said device comprising:

(A) an optical equipment for detecting an object distance on the basis of the principal of optical triangulation with a base line having a length, said optical equipment comprising first and second optical systems located with the base line length of said optical triangulation therebetween and forming an image by a light beam coming from the object with an apparent parallax corresponding to the object distance;

(B) a photoelectric detecting equipment for photoelectrically detecting the apparent parallax of said image formed by said optical equipment, said photoelectric equipment being located to receive the image formed by the optical equipment and producing an electrical signal in response to the parallax;

(C) oscillating means for cyclically varying the mutual relationship between said photoelectric detecting equipment and a light beam path toward the photoelectric equipment formed by said second optical system of said optical equipment at a predetermined frequency;

an image formed by said second optical system of the optical equipment being cyclically shifted on said photoelectric detecting equipment by the operation of said oscillating means;

(D) first electrical circuit means for producing a first signal containing a time ingredient corresponding to the degree of said apparent parallax of the image formed by said photoelectric detecting equipment, said first circuit means being electrically connected with the photoelectric equipment and producing said first signal during the operation of said oscillating means;

(E) position signal generating means for generating a second signal having a time continuation width corresponding to the adjusting condition of said objective lens means along the optical axis, said generating means being operatively associated with said oscillating means and said objective lens means, and generating said second signal on the basis of a first information relating to the operation of the oscillating means and a second information relating to the adjusted position of the objective lens means along the optical axis; and (F) second electrical circuit means for producing a focusing signal to be adapted for focusing said objective lens means on the object, said second circuit means being electrically connected with said first electrical circuit means and said position signal generating means, and producing said focusing signal on the basis of said first signal produced from the first circuit means and said second signal generated by the position signal generating means.

33. A focusing device according to claim 32, wherein said first electrical circuit means is operatively associated with said oscillating means so as to produce said first signal on the basis of said output signal of said photoelectric detecting equipment and said first information relating to the operation of the oscillating means.

34. A focusing device according to claim 32, wherein said oscillating means is operatively coupled to at least a portion of said second optical system of said optical equipment for cyclically moving said portion so as to cyclically vary said mutual relationship between said photoelectric detecting equipment and said light beam path toward the photoelectric equipment formed by said second optical system.

35. A focusing device according to claim 34, wherein said second optical system includes a movable reflecting mirror disposed in the radiation path, and said oscillating means is operatively coupled to said reflecting mirror for cyclically swinging the same in the radiation path so as to cyclically vary said mutual relationship between said photoelectric equipment and said light beam path toward the photoelectric equipment.

36. A focusing device according to claim 34, wherein said second optical system includes a lens member having an optical axis, and said oscillating means is operatively coupled to said lens member for cyclically moving the lens member perpendicularly to said optical axis of said lens member so as to cyclically vary said mutual relationship between said photoelectric equipment and said light beam path toward the photoelectric equipment.

37. A focusing device according to claim 32, wherein said oscillating means being operatively coupled to said photoelectric detecting equipment for cyclically moving the same relative to said second optical system of said optical equipment so as to cyclically vary said mutual relationship between the photoelectric equipment and said light beam path toward the photoelectric equipment.

38. A focusing device according to claim 32, further comprising:

driving means for automatically adjusting the focus of said objective lens means to the object in response to said focusing signal produced from said second electrical circuit means, said driving means being electrically connected with said second circuit means and operatively coupled to said objective lens means.

39. A focusing device according to claim 33, wherein said optical equipment further comprises:

radiation generating means for generating a radiation ray, said radiation generating means being disposed behind said first optical system, said first optical system being adapted to direct the radiation ray generated by said radiation generating means toward said object, and said photoelectric detecting equipment being disposed at a position to receive the reflected radiation ray reflected by the object through said second optical system.

* * * * *

UNITED STATES PATENT OFFICE
CERTIFICATE OF CORRECTION

Patent No. 4,123,650                    Dated  October 31, 1978

Inventor(s) Kazuya Hosoe, S. Matsumoto, et al

It is certified that error appears in the above-identified patent and that said Letters Patent are hereby corrected as shown below:

In the heading of the Patent [76] and [73] should read as follows:

[76] Inventors: Kazuya Hosoe, Tokyo; Seiichi Matsumoto, Kanagawa-ken; Hideo Yokota, Tokyo; Tsuyoshi Asaeda, Kanagawa-ken; Tadahide Fukushima, Tokyo; Tamotsu Shingu, Kanagawa-ken; Shigeru Hashimoto, Kanagawa-ken; Tomonori Iwashita, Tokyo; all of JAPAN

[73] Assignee : Canon Kabushiki Kaisha, Tokyo, JAPAN

Signed and Sealed this

Twentieth Day of February 1979

[SEAL]

Attest:

RUTH C. MASON
Attesting Officer

DONALD W. BANNER
Commissioner of Patents and Trademarks